United States Patent [19]
Inkster

[11] Patent Number: 5,819,430
[45] Date of Patent: Oct. 13, 1998

[54] BEAD DEWATERING APPARATUS AND METHOD

[75] Inventor: Guy William Inkster, Oro Station, Canada

[73] Assignee: Clearly Canadian Beverage Corporation, Vancouver, Canada

[21] Appl. No.: 684,014

[22] Filed: Jul. 23, 1996

[51] Int. Cl.$^6$ ..................................................... F26B 3/08
[52] U.S. Cl. .................. 34/364; 34/424; 34/505; 34/64; 34/167
[58] Field of Search ............................ 34/364, 372, 413, 34/423, 424, 482, 500, 505, 507, 589, 64, 165, 167, 168, 176, 181, 210, 228; 159/2.1, 2.3, 4.02, 4.1; 521/56, 60

[56] References Cited

U.S. PATENT DOCUMENTS

| | | | |
|---|---|---|---|
| 3,265,775 | 8/1966 | Friedrich | 34/364 X |
| 3,443,621 | 5/1969 | Dubreuil | 34/372 X |
| 5,094,011 | 3/1992 | Gräff et al. | 34/364 |
| 5,210,962 | 5/1993 | Jones, Jr. | 34/168 |
| 5,223,088 | 6/1993 | Hansen | 34/372 X |

Primary Examiner—Henry A. Bennett
Assistant Examiner—Steve Gravini
Attorney, Agent, or Firm—Michael A. Glenn

[57] ABSTRACT

Apparatus and a method for de-watering a bead suspension of fragile beads having a high water content suspended in a liquid includes a staging vat, a metering vat, and a de-watering vat. The application of pressurized gas to the staging vat causes the bead suspension to move up a central feed tube which extends from the staging vat to the metering vat. The bead suspension is gravity fed from the metering vat through a transfer pipe and into the de-watering vat. The bottom portion of the de-watering vat has both an inner wall and an outer wall wherein the upper portion of the inner wall has perforations and the bottom portion is solid. Upon entering the de-watering vat, the bead suspension pours a short distance onto an inverted spreader cone. The bead suspension flows down the spreader cone and pours over the edge of the cone toward the perforated upper portion of the inner wall. The liquid flows through the perforations of the upper inner wall to the outer wall, and the de-watered beads are deflected toward the apex of the conical solid bottom portion of the vat for further processing.

28 Claims, 5 Drawing Sheets

BEAD DEWATERING APPARATUS AND METHOD

FIELD OF THE INVENTION

This invention relates to an apparatus and process for removing the bulk of the liquid from a suspension of fragile beads having a high water content suspended in a liquid and for transferring the beads from storage to a dispensing area.

BACKGROUND OF THE INVENTION

Small flavour beads made of edible material are commercially available to enhance the taste of beverages. The beads, known as "gelan" beads, have a very high water content and act much like miniature wet sponges. Such beads are manufactured and sold for example by Endo Food Technologies Inc. of Toronto, Ontario. Gelan beads are very fragile and are difficult to deal with and to manipulate without causing damage to the beads. Because of this, they are typically supplied to beverage manufacturers in suspension in a preservative consisting basically of sugar and water.

The beads in suspension may be introduced directly into beverages. However, it is preferable if possible, to remove the bulk of the preservative so that the beads can be more effectively metered into the beverage containers or bottles. This would minimize the dilution and sweetening of the beverage which otherwise occurs due to the addition of the preservative.

It is an object of this invention to provide an apparatus and process to remove the bulk of the preservative from the suspension without destroying the beads. This process is known as "de-watering". When used in this specification, including the claims, the term "de-watering" means to remove liquid from the suspension.

SUMMARY OF THE INVENTION

In one of its aspects, the invention comprises apparatus for de-watering a suspension of fragile beads having a high water content suspended in a liquid, comprising a staging vat for storing a working supply of the bead suspension, a metering vat for controlling the amount of the bead suspension to be de-watered and a de-watering vat for de-watering the bead suspension.

In another of its aspects, the invention comprises such apparatus wherein the bead suspension flows in sequence from the staging vat, to the metering vat, and to the de-watering vat. The staging vat and the metering vat are connected by a central feed tube comprising a generally cylindrical tube. The metering vat is mounted vertically above the de-watering vat thereby allowing the bead suspension to be gravity fed from the metering vat to the de-watering vat through a transfer pipe. The transfer pipe comprises a generally cylindrical tube and the de-watering vat has a generally cylindrical body, a conical bottom portion.

In yet another of its aspects, the invention comprises de-watering apparatus including a conical spreader and a collector cone comprising a cone with approximately the same diameter as the diameter of the conical spreader, an outlet in the apex of the collector cone and a generally cylindrical vertical tube connecting the outlet of said collector cone with one of the discharge outlets located on the outer wall of the de-watering vat.

In another of its aspects, the invention consists of apparatus for transporting a bead suspension containing fragile beads having a high water content and a liquid from a lower container to an upper container at a higher elevation than said lower container, comprising a generally cylindrical tube extending from within the lower container to within the upper container wherein a first end of said tube terminates near the lowermost portion of said lower container; and means for introducing pressurized gas into said lower container whereby to cause the beads in suspension to migrate from said lower container, through the tube, and into the upper container.

Further aspects of the invention will be apparent from the claims, read in conjunction with the detailed description of the preferred embodiment of the invention.

DETAILED DESCRIPTION OF THE PREFERRED EMBODIMENT

The invention may be fully appreciated by reference to the detailed description which follows in conjunction with the drawings in which.

Figure 1:
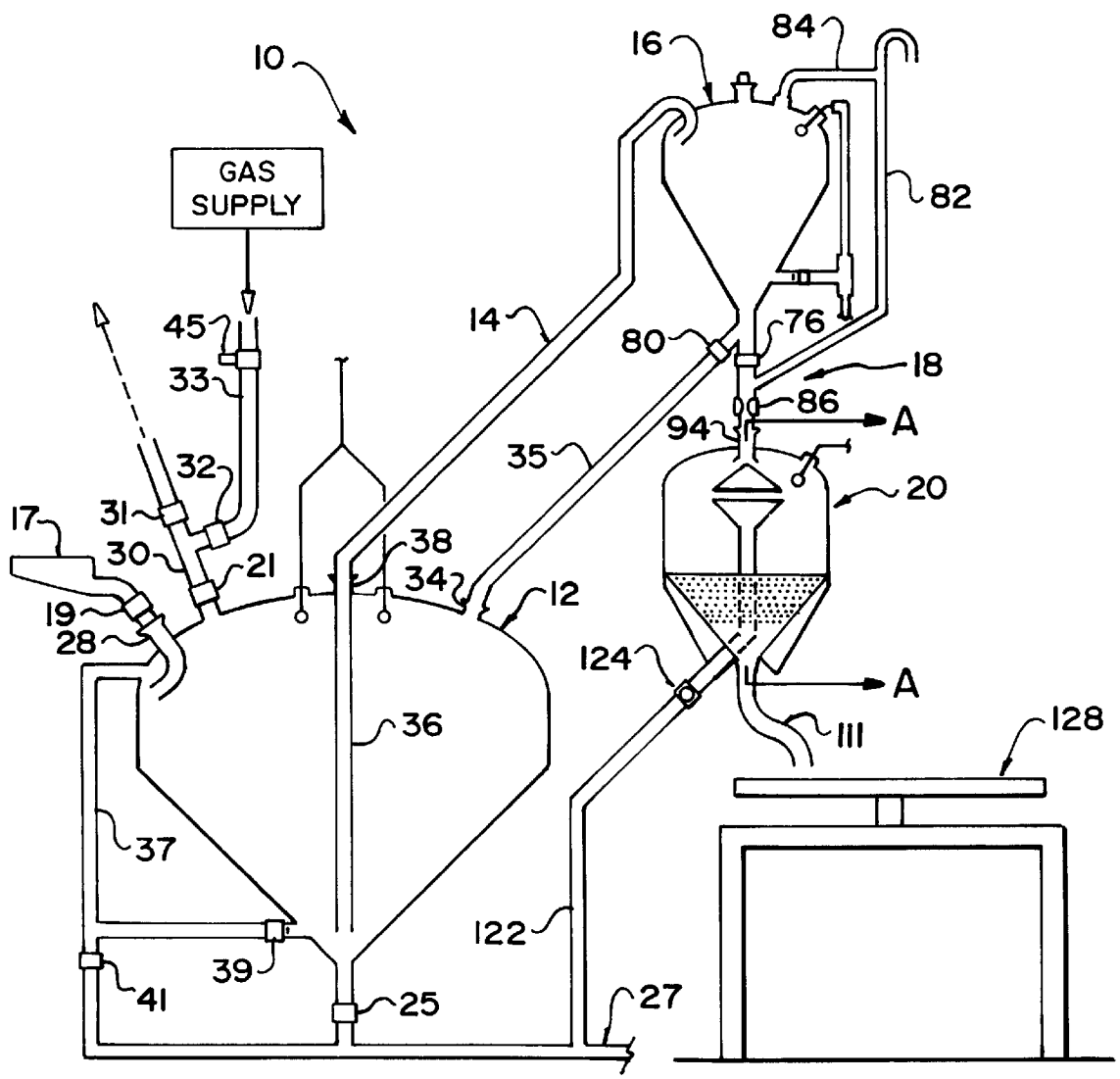
FIG. 1 is a cross-sectional view of the apparatus according to the preferred embodiment of the invention.

FIG. 1 is a cross-sectional view of the overall apparatus 10 according to the preferred embodiment of the invention. The beads in preservative flow through the apparatus 10 starting from a staging vat 12, up a central feed tube 14 to a metering vat 16, from the metering vat 16 through a transfer pipe 18 into a de-watering vat 20, and from the de-watering vat 20 to a pocket filler table 128.

In the preferred embodiment of the invention, the staging vat 12 is located approximately at ground level to facilitate the filling of the staging vat, as for example from a container truck. The metering vat 16 is mounted vertically above the de-watering vat 20, and consequently is at a greater elevation than that of the staging vat 12. Appropriate means known to those skilled in the art are used to support the vats.

Figure 2:
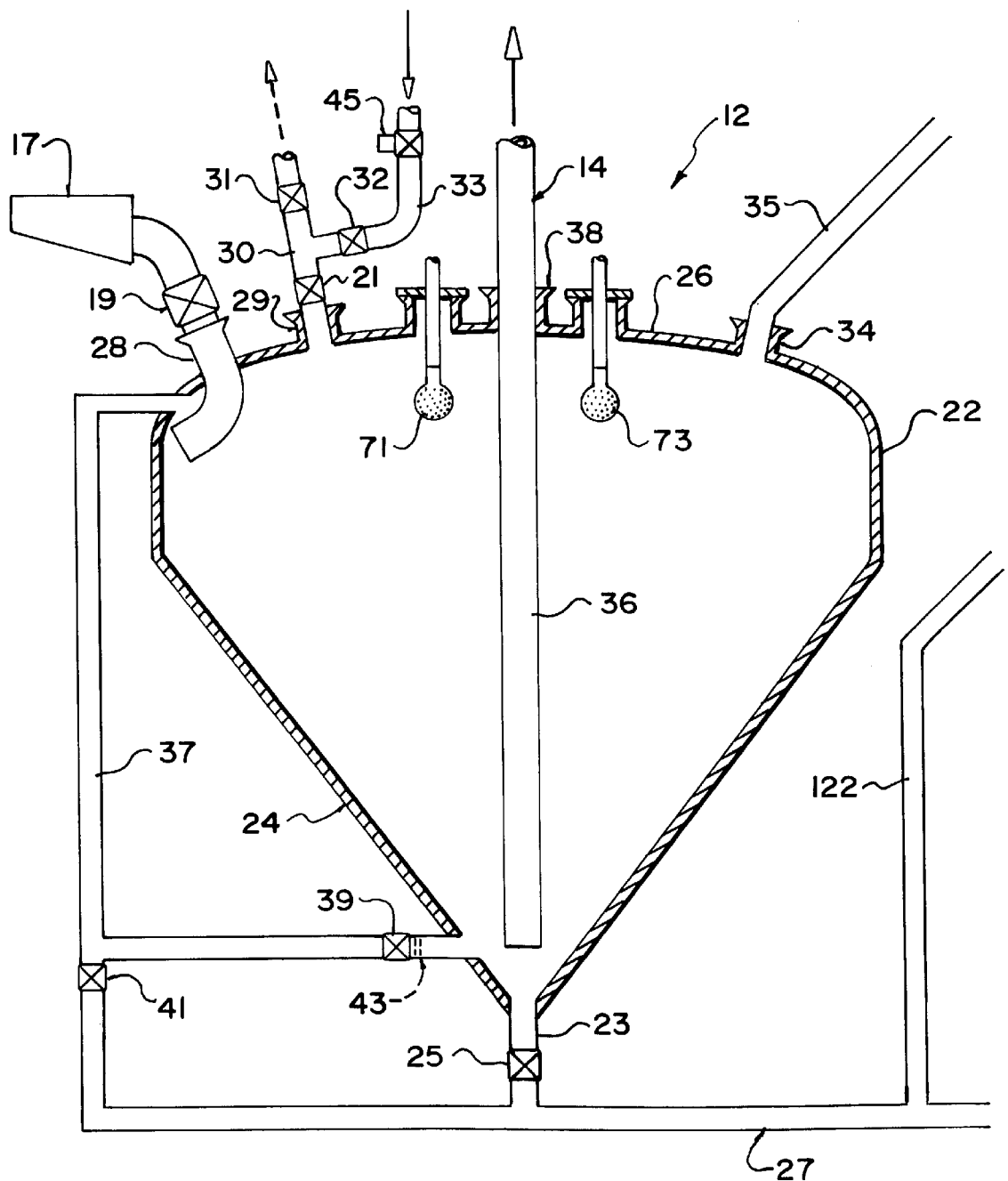
FIG. 2 is a cross-sectional view of the staging vat according to the preferred embodiment of the invention.

FIG. 2 is a cross-sectional view of the staging vat 12. Staging vat 12 consists of a generally cylindrical body 22 having a conical bottom portion 24 and a spherical top portion 26. A batch supply of beads in preservative (for example, enough to supply one day's requirements) are stored in the staging vat 12. An inlet 28 is provided on the top portion 26 for filling the staging vat 12 with a batch of beads in preservative. The inlet 28 is provided with a butterfly valve 19 to control the flow of the beads into the staging vat 12. The beads may be fed to the inlet 28 by any suitable means, for example a bead loading trough 17 as illustrated in FIG. 1. Inlet 28 is turned into the wall of the staging vat 12. The top portion 26 is also provided with an inlet 29 which is connected to a venting pipe 30. The first end of the venting pipe 30 adjacent to the inlet 28 is provided with a butterfly valve 21 and the second end of the venting pipe 30 is provided with a ball valve 31. The side of the venting pipe 30 is provided with a gas feed valve 32 which is connected to a gas feed line 33. A gas regulator 45 controls the flow of gas through the gas feed line 33. By closing the gas feed valve 32, and opening the butterfly valve 21 and the ball valve 31 of the venting pipe 30, atmospheric pressure relief is provided to the staging vat 12 during filling. The inlet 28 itself also provides venting during the filling procedure. Another inlet 34 on the top portion 26 is provided to receive the discharge from the return line 35 as described in more detail below.

A discharge port 23 is located at the apex of the bottom portion 24 of the staging vat 12 and is used for draining the staging vat 12. The conical shape of the bottom portion 24 not only prevents the beads from bunching up but also enhances the flow of the beads through the discharge port 23. A butterfly valve 25 is provided in the discharge port 23 to control the flow of beads. The discharge port 23 is connected to a discharge/recovery line 27 from which the beads may be directed into a container, or discharged as waste.

A transparent monitor pipe 37 is mounted vertically adjacent the staging vat 12. The monitor pipe 37 is connected to the bottom of the staging vat 12. The level of beads in the staging vat 12 can thereby be visually monitored by the height of the beads in the monitor pipe 37. A butterfly valve 39 is provided in the monitor pipe 37 to isolate it from the staging vat 12 when needed. A screen 43 is also provided in the monitor pipe 37 to prevent the beads from entering the monitor pipe 37 while allowing the preservative to do so. The bottom of the monitor pipe 37 is connected to the discharge/recovery line 27. A butterfly valve 41 is provided at the bottom of the monitor pipe 37 to isolate it from the discharge/recovery line 27.

The central feed tube 14 consists of an elongated cylindrical tube. Referring to FIGS. 1 and 2, the bottom portion 36 of the feed tube 14 extends vertically from near the apex of the conical bottom portion 24 of the staging vat 12 through an outlet 38 in the centre of the top portion 26 of the staging vat 12. The feed tube 14 leads up to the metering vat 16. With the butterfly valve 19 and the ball valve 31 closed, and the gas feed valve 32 and butterfly valve 21 open, pressurized gas may be made to flow from the gas feed line 33 through inlet 29 and into the staging vat 12. This serves to apply pressure onto the beads in the staging vat 12 causing the beads to move up the feed tube 14. The gas from the gas feed line 33 may be air or any other gas that does not have a negative effect on the beads. By using positive pressure as the prime motive force to move the beads up the feed tube 14, the mechanical stress placed on the beads is minimized thereby providing an important contribution to reducing damage to the beads.

Figure 3:
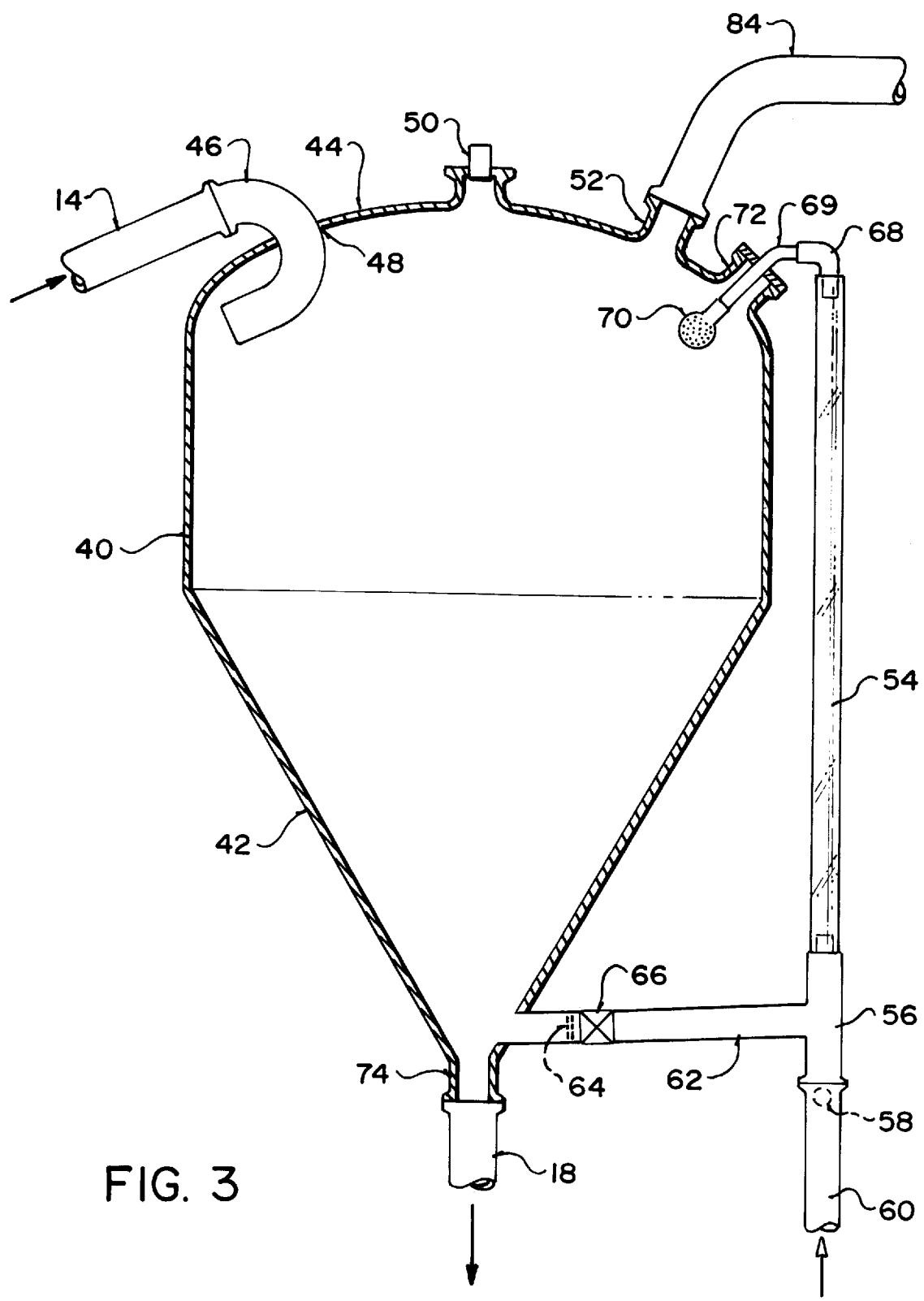
FIG. 3 is a cross-sectional view along line A—A of FIG. 1 showing the metering vat according to the preferred embodiment of the invention.

FIG. 3 is a cross-sectional view of the metering vat 16. Metering vat 16 consists of a generally cylindrical body 40, a conical bottom portion 42 and a spherical top portion 44. The central feed tube 14 is connected to the metering vat 16 by a U-shaped inlet pipe 46 which is disposed in an inlet port 48. The inlet pipe 46 discharges the beads onto the wall of the metering vat 16 to minimize the damage to the beads by causing them to pour down the side wall of the vat. A sonar sensor 50 is mounted centrally on the top portion 44 of the metering vat 16 in a suitable ferruled inlet. The sonar sensor 50 detects the level of beads in the vat. When the level reaches a predetermined set point, the pressure applied to the staging vat 12 is controlled so as to stop the flow of beads to the metering vat 16. The discharge of the beads from the inlet pipe 46 onto the wall of the metering vat 16 keeps the incoming beads from interfering with the sonar sensor's signal.

The top portion 44 of the metering vat 16 is provided with a vent port 52 for atmospheric venting.

A transparent volume monitor pipe 54 is mounted vertically adjacent the metering vat 16. The bottom of the monitor pipe 54 is connected to a short vertical pipe 56. The bottom of the pipe 56 is provided with a ball valve 58 which is connected to a "clean in place" feed line 60. A horizontal pipe 62 is provided in the side of the vertical pipe 56. The horizontal pipe 62 is connected to an outlet provided in the bottom portion 42 of the metering vat 16. A screen 64 is provided in the horizontal pipe 62 to prevent the beads from entering the monitor pipe 54 while allowing the preservative to do so. A 2" pipe is used for horizontal pipe 62 in order to provide a sufficiently large area for screen 64 so as to provide sufficient flow to the monitor pipe 54 and to facilitate cleaning. The level of beads in preservative in the metering vat 16 can thereby be visually monitored by the height of the preservative in the monitor pipe 54. A butterfly valve 66 is provided in the horizontal pipe 62 to isolate the monitor pipe 54 from the metering vat 16 when needed.

The top of the monitor pipe 54 is provided with a 90° joint 68. A pipe 69 extends from the end of the joint 68 and is disposed through an inlet ferrule 72 in the metering vat 16. A "clean in place" sprayball 70 comprising a hollow sphere with perforations on the surface of said sphere is mounted on the end of the pipe 69. By shutting the butterfly valve 66, water or cleaning solution from the feed line 60 may be directed up the monitor pipe 54 and discharged through the sprayball 70 into the metering vat 16. This serves to flush or clean the metering vat 16. The sprayball 70 also acts as a vent for the pressure in the monitor pipe 54.

It will be appreciated by those skilled in the art that the top portions of the staging vat 12 and the de-watering vat 20 can be fitted with "clean in place" sprayballs similar to that found in the metering vat 16. These are illustrated as sprayballs 71 and 73 in FIG. 2 and sprayball 75 in FIG. 4. The sprayballs can be connected to feed lines which supply water or cleaning solution. As in the case of the metering vat 16, the water or cleaning solution from the feed lines may be discharged through the sprayballs to flush or clean the vats.

A discharge port 74 is located at the apex of the bottom portion 42 of the metering vat 16. The conical shape of the bottom portion 42 not only prevents the beads from bunching up but also enhances the flow of the beads through the discharge port 74. The discharge port 74 of the metering vat 16 connects to the transfer pipe 18.

Figure 5:
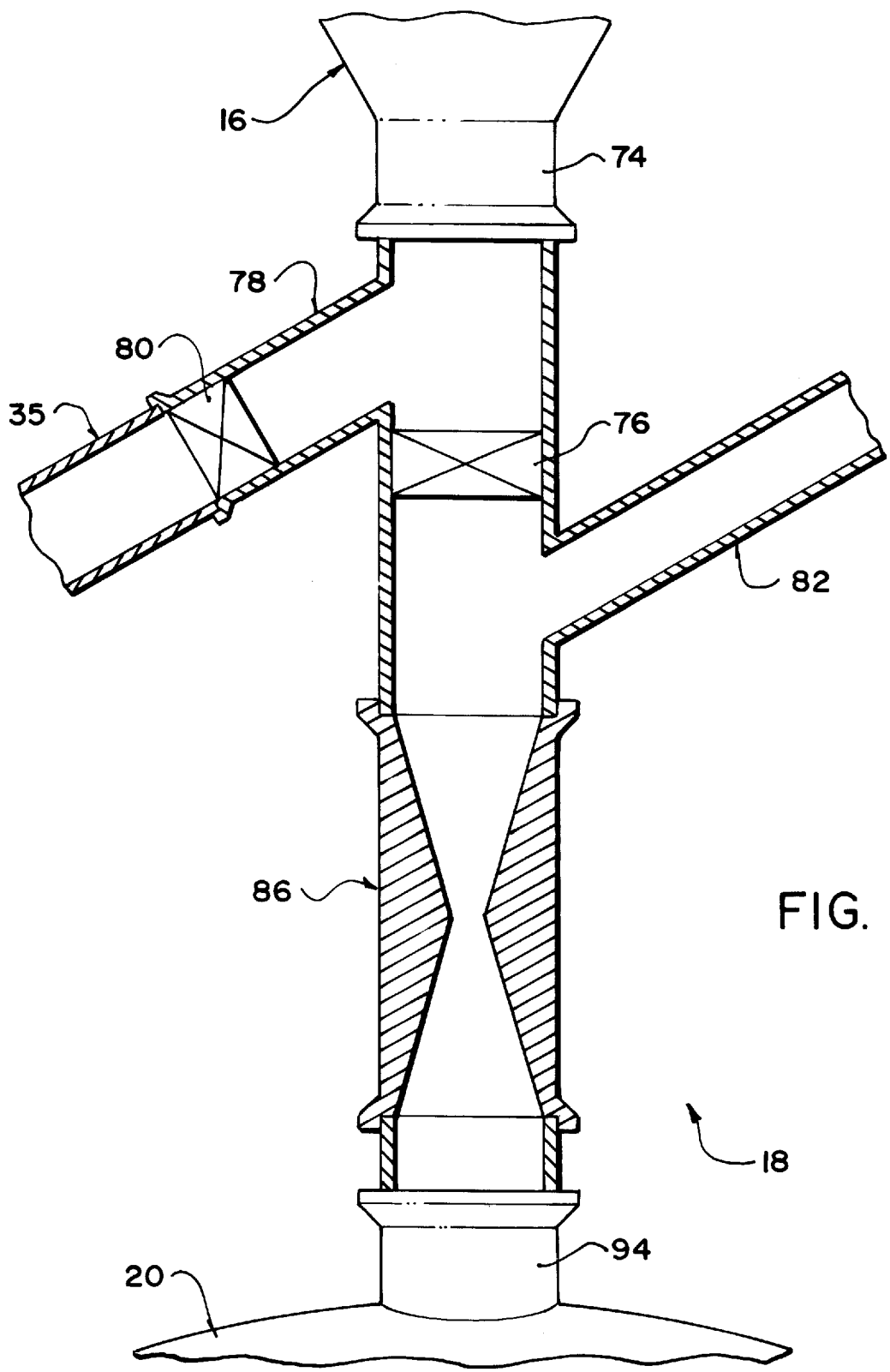

FIG. 5 is a cross-sectional view of the transfer pipe 18. The transfer pipe 18 consists of a generally cylindrical tube and is provided with an automatic valve 76 for metering the volume of beads in preservative to be gravity fed from the metering vat 16 through the transfer pipe 18 to the de-watering vat 20. The use of gravity as the principal motive force to feed the beads from the metering vat 16, through the transfer pipe 18, through the de-watering vat 20, and into the pocket filler table 128 minimizes the stress placed on the beads. The upper portion of the transfer pipe 18 includes a Y-connector 78.

Referring to FIGS. 1 and 5, the arm of the Y-connector 78 is connected to the return line 35. The return line 35 includes a manual butterfly valve 80 which can be opened to direct the outflow from the metering vat 16 through the pipe to the staging vat 12. This is useful for example to return unused beads to the staging vat during flavor changes or to allow cleaning of the metering vat.

A vent pipe 82 is provided in the transfer pipe 18. The bottom portion of the vent pipe 82 extends diagonally up and away from the transfer pipe 18. The middle portion of the vent pipe 82 extends vertically adjacent to the metering vat 16. The top portion of the vent pipe 82 ends with an inverted U-shape. The top portion of the vent pipe 82 is also connected to the vent port 52 of the metering vat 16 through a short horizontal length of pipe 84.

Referring to FIG. 5, the transfer pipe 18 includes a conical restrictor 86 consisting of a generally hourglass shaped narrowing of the pipe. The conical restrictor 86 is located below the connection to the vent pipe 82 and reduces the flow of the beads thereby limiting the speed of dispensing into the de-watering vat 20. The conical restrictor 86 of the preferred embodiment has a total length of about 9 inches, an even tapering from a diameter of about 2 inches at the ends of conical restrictor 86 to a diameter of about half an inch at the point of maximum restriction.

Figure 4:
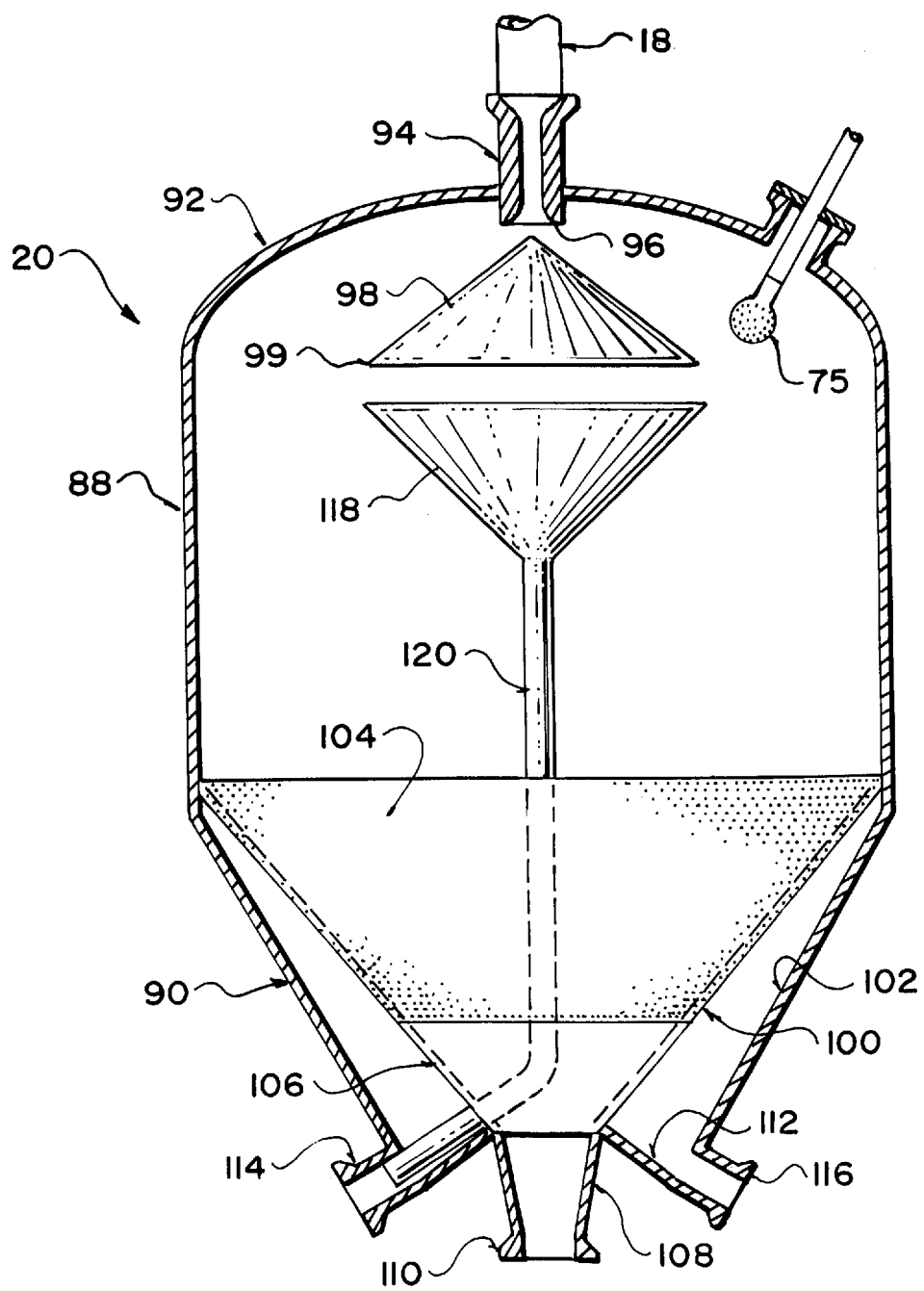
FIG. 4 is a cross-sectional view of the de-watering vat according to the preferred embodiment of the invention; and, FIG. 5 is a cross-sectional view of the transfer pipe according to the preferred embodiment of the invention.

FIG. 4 is a cross-sectional view of the de-watering vat 20 which consists of a generally cylindrical body 88, a generally conical bottom portion 90 and a spherical top portion 92. A distribution outlet 94 is provided between the conical restrictor 86 of the transfer pipe 18 and the de-watering vat 20. The distribution outlet 94 includes a restriction followed by a flaring out in an evenly rounded port 96. Since the beads are still in a water-like state at this point, they behave like water and tend to follow the wall of the distribution outlet 94 to the edge of the port 96 and pour evenly out of the port 96 along its edges.

At the top of the de-watering vat 20, there is provided an inverted spreader cone 98 whose apex is about one inch from the port 96. The beads in preservative flow from the port 96 evenly onto the spreader cone 98. The lower edge 99 of the spreader cone 98 is curved slightly outward (not shown) so as to encourage a smooth pour of the beads and preservative over the edge of the cone and beyond the edge of the collector cone 118 described in more detail below.

The beads in preservative pour down from the edge 99 about one foot toward the bottom of the de-watering vat. The bottom portion 90 of the de-watering vat 20 is generally conical in shape with both an inner wall 100 and an outer wall 102. The conical shape of the walls assists in preventing the bunching up of the beads. The outer wall 102 diverges away from the inner wall 100 in the downward direction. The inner wall 100 is provided with perforations in its upper portion 104 while the lower portion 106 of the inner wall near the apex is solid. The apex of the lower portion 106 of the inner wall 100 terminates in a conical reducer 108 and an outlet ferrule 110. The outer wall 102 of the bottom portion 90 of the de-watering vat flares out to define a broader cone than the inner wall 100 and terminates in an annular pocket 112 below the apex of the inner wall. The annular pocket 112 is provided with two discharge ports 114 and 116.

Upon falling from the spreader cone 98 to the perforated upper portion 104 inner wall 100, the beads in preservative hit the perforated wall and are deflected toward the apex of the cone. The effect of the beads hitting the perforated wall and slightly changing direction has the effect of discharging the preservative, which flows through the perforations to the outer wall 102 of the de-watering vat 20, to the pocket 112 and eventually through the discharge ports 114 and 116.

Referring to FIG. 1, the discharge ports 114 and 116 are joined into a collecting pipe 122 by a Y-joint 124. The recovered preservative from the discharge ports 114 and 116 flow through the collecting pipe 122 and into the discharge/recovery line 27.

Referring again to FIG. 4, a collector cone 118 is provided immediately below the spreader cone 98. The open end of the collector cone 118 is approximately the same diameter as (but not substantially greater) the diameter of the bottom of the spreader cone 98. In the preferred embodiment, the collector cone 118 has a maximum diameter of 15 inches while the spreader cone 98 has a maximum diameter of 14 inches. Preservative which tends to cling to the spreader cone 98 eventually drips off the edge of the spreader cone 98 directly downward and is captured by the collector cone 118. A collection pipe 120 extends downwardly from the apex of the collector cone 118 to one of the discharge ports 114.

From the outlet ferrule 110 of the de-watering vat 20, the de-watered beads are dispensed onto a pocket filler table 128 for collecting the beads to deliver them to a receptacle. The outlet ferrule 110 leads to a slightly inclined discharge pipe 111 extending to the pocket filler table. The pocket filler table 128 is of a type known to those skilled in the art and is not described in detail herein. A sonar sensor is provided on the table for detecting the need for additional beads for processing. The sensor is in turn connected to the automatic valve 76 for controlling the flow of beads in preservative from the metering vat 16 through the transfer pipe 18 to the de-watering vat 20 as required.

In the preferred embodiment of the invention, the inclusive angle of the conical bottom portion 42 of the metering vat 16 is about 60°. For the de-watering vat 20, the inclusive angle of the conical bottom portion 90 is about 80° for the inner wall 100 and about 60° for the outer wall 102. The distance between the lower edge of the inverted spreader cone 98 and the top edge of the conical bottom portion 90 of the de-watering vat 20 is about 10". The perforations of the upper portion 104 of the inner wall 100 of the de-watering vat 20 are about $\frac{1}{16}$" in diameter and there are approximately 80 perforations/square inch.

The following describes the general operation of overall apparatus and methods of the invention. With the butterfly valve 21 and the ball valve 31 of the venting pipe 30 open to allow atmospheric venting, a batch of beads in preservative is added to the staging vat 12 through the inlet 28. Additional venting may be provided through the inlet 28 itself. The inlet 28 and the butterfly valve 31 are then closed to seal the staging vat 12 from the atmosphere. The gas feed valve 32 may then be opened, allowing pressurized gas to flow from the gas feed line 33 through the venting pipe 30 and into the staging vat 12. The gas pressure applied to the bead suspension causes the bead suspension to move up the feed tube 14 through the U-shaped inlet pipe 46 of the metering vat 16 and onto the inner wall of the vat. The bead suspension then slides down the inner wall into the bottom portion 42 of the metering vat 16.

The sonar sensor 50 in the metering vat 16 detects the level of the bead suspension in the metering vat 16. Once a pre-determined level is reached, the gas feed valve 32 is closed to maintain constant pressure within the staging vat 12. This stops the flow of the bead suspension up the central feed tube 14 and prevents the backflow of the bead suspension in the feed tube 14. The operator may check the level of bead suspension in the metering vat 16 by looking at the volume monitor pipe 54.

The bead suspension flows through the discharge port 74 of the metering vat 16 and into the transfer pipe 18. The sensor on the pocket filter table 128 is connected to the automatic valve 76 which meters the volume of bead suspension to be gravity fed from the metering vat 16 through the transfer pipe 18 to the de-watering vat 20. If necessary, by manually opening the valve 80 in the return line 35, the outflow from the metering vat 16 can be directed from the transfer pipe 18 into the staging vat 12. If the valve 80 is closed and the automatic valve 76 open, the bead suspension will move down the transfer pipe 18. The conical restrictor 86 will slow down the movement of the bead suspension to a speed appropriate to effective de-watering.

The bead suspension then flows into the de-watering vat 20. Since the bead suspension is in a water-like state, it tends to follow the wall of the distribution outlet 94 to the edge of the rounded port 96. The bead suspension then pours evenly off the rounded port 96 a short distance onto the spreader cone 98. The bead suspension flows down the spreader cone 98 and pours down the edge 99 of the cone toward the bottom of the de-watering vat 20.

Upon falling from the spreader cone 98, the beads in preservative hit the perforated upper portion 104 of the inner wall 100 of the de-watering vat 20 and are deflected toward the apex of the conical bottom portion 90 of the vat. The preservative is discharged from the bead suspension and flows through the perforations to the outer wall 102 of the de-watering vat 20 and into the annular pocket 112. Eventually, the recovered preservative flows out of the discharge ports 114 and 116 in the outer wall 102 and is collected in the discharge/recovery line 27. The de-watered beads proceed downward across the surface of the perforated upper portion 104 of the inner wall 100 to the solid lower portion 106 of the inner wall 100. The de-watered beads are eventually funnelled toward the apex of the cone formed by the inner wall 100 and to the outlet ferrule 110 and dispensed from where they are onto a pocket filler table 128. When a sufficient quantity of de-watered beads are on the pocket filler table 128, the sensor on the table causes the automatic valve 76 to shut off.

Some of the preservative tends to cling to the spreader cone 98. This excess preservative drips into the collector cone 118 down the collector pipe 120 and out one of the discharge ports 114. From the discharge port 114, the preservative is channelled to the discharge/recovery line 27 for eventual re-use or disposal.

It will be appreciated by those skilled in the art that the invention allows the beads to be substantially de-watered before being presented to the pocket filler table 128 with minimal loss of integrity of the beads. The invention also allows de-watered beads to be metered to the pocket filler table and the preservative in which the beads are supplied may be effectively recovered.

It will be appreciated by those skilled in the art that certain variations of the preferred embodiment of the invention may be practised without departing from the principles thereof.

I claim:

1. Bead suspension de-watering apparatus comprising:
   a staging vat having a generally cylindrical body and a conical bottom portion, said staging vat storing a working supply of a suspension of fragile beads having a high water content suspended in a liquid;
   a metering vat having a generally cylindrical body and a conical bottom portion, said metering vat controlling the amount of the bead suspension to be de-watered; and,
   a de-watering vat having a generally cylindrical body and conical bottom portion, said de-watering vat removing the bulk of a preservative from said suspension without destroying said beads.

2. Bead suspension de-watering apparatus comprising:
   a staging vat having a generally cylindrical body and a conical bottom portion, said staging vat storing a working supply of a suspension of fragile beads having a high water content suspended in a liquid;
   means for transferring said suspension from said staging vat to a metering vat;
   said metering vat having a generally cylindrical body, a conical bottom portion and an outlet to a de-watering vat, said metering vat controlling the amount of said suspension to be de-watered;
   gravity feed means for transferring said suspension from said metering vat to a de-watering vat comprising said metering vat being at a higher elevation than said de-watering vat; and
   a de-watering vat having a Generally cylindrical body and a conical bottom portion, said de-watering vat removing the bulk of a preservative from said suspension without destroying said beads.

3. Apparatus as in claim 1 wherein the metering vat is mounted at an elevation greater than that of the staging vat, and said metering vat and said staging vat are connected by a central feed tube comprising a generally cylindrical tube.

4. Apparatus as in claim 3 wherein the lower portion of said central feed tube passes through an outlet in said staging vat and terminates near the bottom portion of said staging vat, and the upper portion of said central feed tube passes through an inlet in said metering vat and terminates facing the inner wall of said metering vat.

5. Apparatus as in claim 4 wherein the top portion of said staging vat includes a gas inlet for introducing pressurized gas into said staging vat whereby to force the movement of beads up said central feed tube.

6. Apparatus as in claim 1 further comprising a transfer pipe consisting of a generally cylindrical tube, the upper portion of said transfer pipe being connected to an outlet in the bottom portion of said metering vat, and the lower portion of said transfer pipe being connected to an inlet in the upper portion of said de-watering vat.

7. Apparatus as in claim 6 wherein the transfer pipe has a narrowed portion in a generally hourglass shape for reducing the velocity of the bead suspension flowing through said transfer pipe.

8. Apparatus as in claim 7 wherein the transfer pipe has an automatic valve for controlling the volume of bead suspension flowing through said transfer pipe.

9. Apparatus as in claim 8 wherein the top portion of the transfer pipe includes an outlet for directing excess bead suspension out of said transfer pipe.

10. Apparatus as in claim 9 wherein the transfer pipe includes an outlet for atmospheric venting.

11. Apparatus as in claim 1 wherein the de-watering has an inlet in the top portion of said de-watering vat and an outlet in the bottom portion of said de-watering vat.

12. Apparatus as in claim 11 wherein the conical bottom portion of said de-watering vat has both an inner wall and an outer wall, said inner and outer wall being spaced from one another.

13. Apparatus as in claim 12 wherein the upper portion of said inner wall has perforations.

14. Apparatus as in claim 13 wherein the de-watering vat includes an inverted cone located within said de-watering vat and directly under the inlet of said de-watering vat.

15. Apparatus as in claim 14 wherein the inlet of said de-watering vat has a distribution outlet comprising a vertically mounted generally cylindrical tube, a narrowing in said tube and a flaring out to an evenly rounded port at the bottom end of said tube.

16. Apparatus as in claim 15 wherein the outer wall of the bottom portion of the de-watering vat has two discharge outlets for directing the liquid of the de-watered bead suspension away from said de-watering vat.

17. Apparatus as in claim 16 wherein the de-watering vat includes a collector cone having a diameter not substantially greater than the diameter of said inverted cone and being located directly under said inverted cone, an outlet in the apex of said collector cone, and a generally cylindrical vertical tube connecting the outlet of said collector cone with one of the discharge outlets located on the outer wall of said de-watering vat.

18. Apparatus as in claim 3 wherein:
    said metering vat is mounted vertically above the de-watering vat thereby allowing the bead suspension to be gravity fed from said metering vat to said de-watering vat through a transfer pipe comprising a generally cylindrical tube;
    said de-watering vat has a generally cylindrical body, a conical bottom portion, an inlet in the top portion of said de-watering vat and an outlet in the bottom portion of said de-watering vat.

19. Apparatus as in claim 18 wherein the lower portion of said central feed tube passes through an outlet in said staging vat and terminates near the bottom portion of said staging vat, and the upper portion of said central feed tube passes through an inlet in said metering vat and terminates facing the inner wall of said metering vat.

20. Apparatus as in claim 18 wherein the transfer pipe is a generally cylindrical tube, the upper portion of said transfer pipe is connected to an outlet in the bottom portion of said metering vat, and the lower portion of said transfer pipe is connected to an inlet in the upper portion of said de-watering vat.

21. Apparatus as in claim 20 wherein the transfer pipe has a conical restrictor comprising a narrowing of said transfer pipe for reducing the velocity of the bead suspension flowing through said transfer pipe and an automatic valve for controlling the volume of bead suspension flowing through said transfer pipe.

22. Apparatus as in claims 18 wherein the conical bottom portion of said de-watering vat has both an inner wall and an outer wall.

23. Apparatus as in claim 22 wherein the upper portion of said inner wall has perforations.

24. Apparatus as in claim 23 wherein the de-watering vat includes an inverted cone located directly under the inlet of said de-watering vat.

25. Apparatus as in claim 24 wherein the inlet of said de-watering vat has a distribution outlet comprising a vertically mounted generally cylindrical tube, a narrowing in said tube followed by a flaring out to an evenly rounded port at the bottom end of said tube.

26. Apparatus as in claim 25 wherein the outer wall of the bottom portion of the de-watering vat has two discharge outlets for directing the liquid of the de-watered bead suspension away from said de-watering vat.

27. Apparatus as in claim 26 wherein the de-watering vat includes a collector cone comprising:
    a cone with approximately the same diameter as the diameter of the conical spreader located directly under said conical spreader;
    an outlet in the apex of said collector cone;
    a generally cylindrical vertical tube connecting the outlet of said collector cone with one of the discharge outlets located on the outer wall of said de-watering vat.

28. A method of removing the bulk of a preservative from a suspension of fragile beads having a high water content and a liquid without destroying said beads comprising the steps of:
    storing a working supply of said suspension in a staging vat;
    feeding said suspension from said staging vat to a metering vat having an outlet to a de-watering vat;
    controlling the amount of the bead suspension to be transferred from said metering vat to said de-watering vat; and
    transferring said suspension from said metering vat to said de-watering vat and removing the bulk of said preservative from said suspension without destroying said beads in said de-watering vat.

* * * * *